United States Patent [19]

Huff

[11] 4,359,145
[45] Nov. 16, 1982

[54] DEMOUNTABLE CLUTCH SUPPORT FOR GEAR TRANSMISSION

[75] Inventor: Martin Huff, Tettnang, Fed. Rep. of Germany

[73] Assignee: Zahnradfabrik Friedrichshafen Aktiengesellschaft, Friedrichshafen, Fed. Rep. of Germany

[21] Appl. No.: 142,680

[22] Filed: Apr. 22, 1980

[30] Foreign Application Priority Data

Apr. 23, 1979 [DE] Fed. Rep. of Germany ....... 2916346

[51] Int. Cl.³ ............................................. F16D 25/12
[52] U.S. Cl. ...................................... 192/112; 192/20; 74/606 R
[58] Field of Search .................... 192/67 R, 112, 85 A, 192/85 AA, 20; 74/606 R

[56] References Cited

U.S. PATENT DOCUMENTS

| | | | |
|---|---|---|---|
| 3,374,687 | 3/1968 | Vogt | 74/606 X |
| 3,921,774 | 11/1975 | Hagen | 192/112 X |
| 4,043,226 | 8/1977 | Bulick | 192/67 X |
| 4,049,100 | 9/1977 | Davis | 192/112 X |
| 4,064,979 | 12/1977 | Crankshaw | 192/85 AA |

Primary Examiner—George H. Krizmanich
Attorney, Agent, or Firm—Karl F. Ross

[57] ABSTRACT

A clutch assembly, constituting a component of a gear transmission, has two gear-carrying shaft extremities projecting from opposite sides of a clutch casing. One shaft extremity is provided with axially extending teeth, carried on its face or on a sleeve keyed thereto, normally engaging similar teeth on a confronting drive shaft. The other shaft extremity is mounted, by means of a combined journal and thrust bearing, in a retaining member which is detachably secured to the transmission housing and has passages for supplying pressure fluid (oil) to the clutch casing. Upon removal of the retaining member, the assembly can be axially shifted to disengage the first-mentioned shaft extremity from the drive shaft whereupon it can be laterally withdrawn from the transmission housing.

10 Claims, 4 Drawing Figures

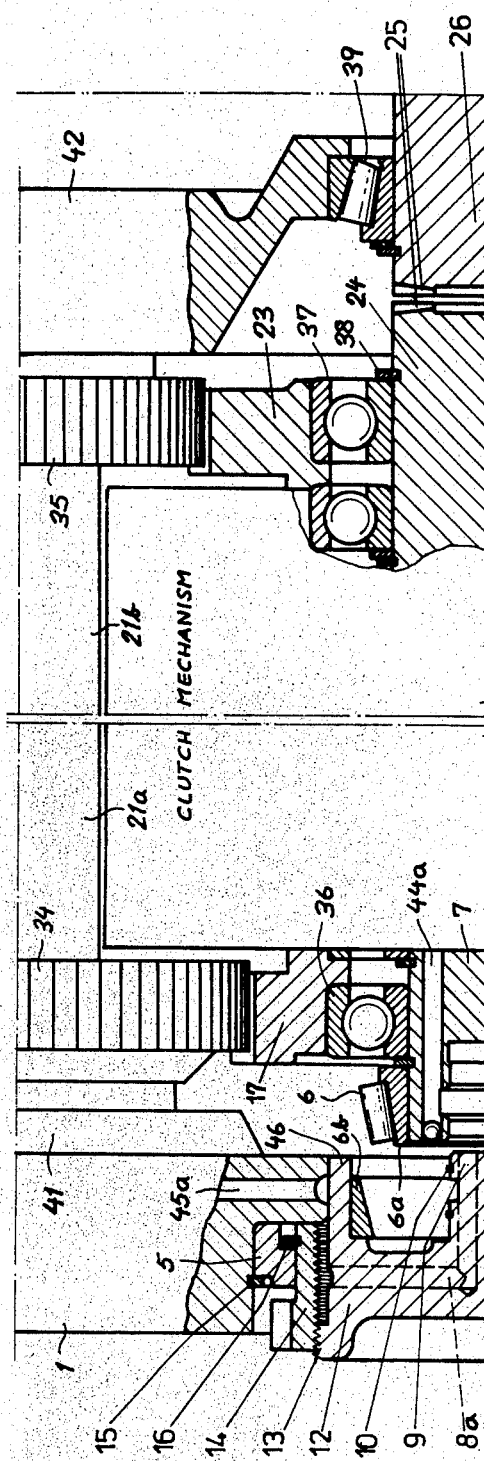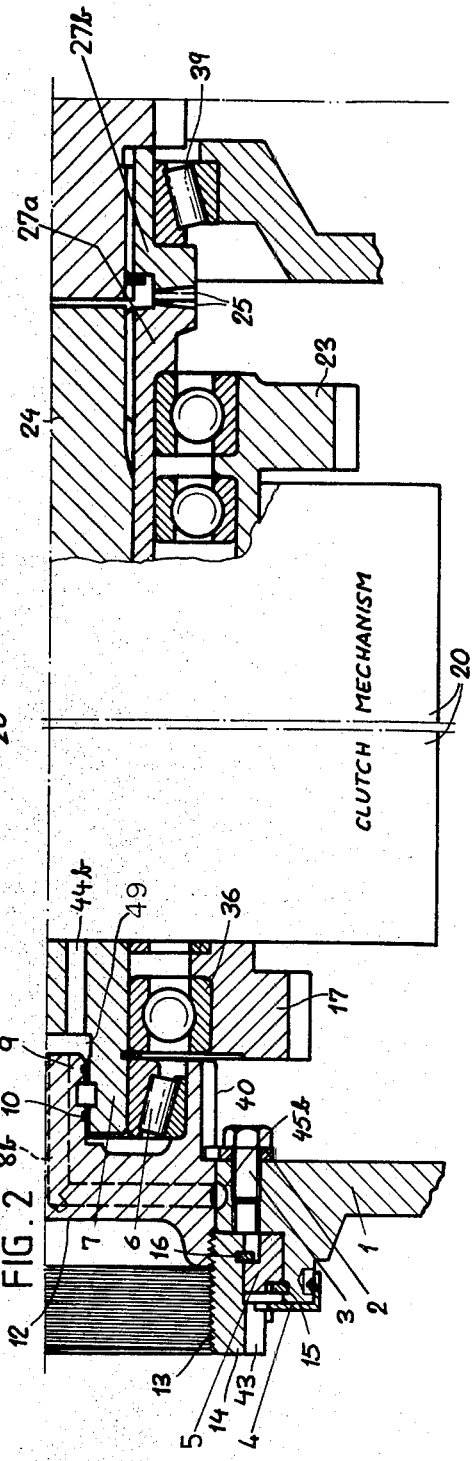

DEMOUNTABLE CLUTCH SUPPORT FOR GEAR TRANSMISSION

FIELD OF THE INVENTION

My present invention relates to a demountable support for a clutch mechanism forming part of a gear transmission.

BACKGROUND OF THE INVENTION

In automotive transmission systems it is often necessary to remove certain components, especially clutches, from the remainder of the system after they have been damaged by an accident or by improper operation on the part of the driver. Since fluid-actuated clutches require both mechanical and fluidic connections, their disassembly and reassembly is relatively complicated. In heavy-duty vehicles such as tractors, for example, conventional systems necessitate a virtual dismantling of the vehicle for this purpose.

It has already been proposed (see commonly owned German published specification No. 1,600,233) to provide a demountable clutch whose casing, acting as a counterbearing, is bolted onto a coupling flange rigid with a first shaft while an axially slidable coupling sleeve has axially extending teeth in mesh with similar teeth on a second shaft, these two sets of teeth being held together by a cap nut secured by a grub screw against detachment. In order to enable a removal of this clutch, the counterbearing must be detached from the coupling flange whereupon the cap nut is unscrewed from the second shaft to allow disengagement of the teeth thereof from those of the sleeve by an axial shift of the latter. The coupling sleeve of this clutch, designed as a hollow shaft, is supported only at one end by the aforementioned cap nut. Such as assembly, therefore, would not be suitable for transmission systems of, say, the torque-splitting type in which two gears carried on respective shaft ends at opposite sides of the clutch casing must be precisely aligned with coacting gears on another shaft parallel thereto in order to form respective branches of a power train to be selectively established between a drive shaft and a load.

OBJECTS OF THE INVENTION

An object of my present invention, therefore, is to provide an improved clutch mounting which can be conveniently disassembled and, in its assembled state, enables the accurate positioning of gears entrainable by an associated drive shaft.

Another object of my invention is to provide simple means for supplying such a clutch mechanism with pressure fluid (referred to hereinafter as oil) in its operating condition.

SUMMARY OF THE INVENTION

In the system here contemplated, a clutch mechanism designed for the optional transmission of torque from a drive shaft to one or two driven shafts offset therefrom, all journaled in a common housing, has an intermediate shaft with two oppositely facing extremities that are coaxial with the drive shaft, the intermediate shaft being linked with the aforementioned power train upon the actuation of the clutch mechanism. A first extremity of the intermediate shaft is connected with the drive shaft by a coupling comprising interengaging axially extending teeth which, if desired, may be secured against disengagement by a cap nut in the manner known per se from the above-identified German published specification. The other shaft extremity is axially and radially supported by bearing means on a retaining member which is detachably secured to the housing, this extremity and the retaining member being provided with communicating passages for the selective admission of oil to the clutch mechanism. Upon detachment of the retaining member, the teeth of the coupling can be disengaged by a bodily axial shift of the clutch mechanism relative to the housing so as to facilitate an extraction of that mechanism.

The axially extending teeth of the drive-shaft coupling may be disposed on confronting faces of the adjoining shaft ends or, especially with use of a cap nut, on sleeves respectively keyed to the shaft ends.

The retaining member advantageously comprises a disk perpendicular to the axis of the drive and intermediate shafts, this disk being provided with an axial boss extending into an axial bore of the adjoining shaft extremity to serve on the one hand as an additional support therefor and on the other hand as a conduit for the oil. An outer race of a combined journal and thrust bearing for this shaft extremity may be mounted directly on the disk or may be held in position with the aid of an annular carrier separate from but in contact with that disk.

BRIEF DESCRIPTION OF THE DRAWING

The above and other features of my invention will now be described in detail with reference to the accompanying drawing in which:

FIG. 1 is an axial sectional view of an upper half of a clutch mounting embodying my invention, shown in a position of partial disconnection from a transmission housing;

FIG. 2 is a view similar to FIG. 1, showing the lower half of the clutch mounting (with certain modifications) in its operative position;

SPECIFIC DESCRIPTION

Figure 3:
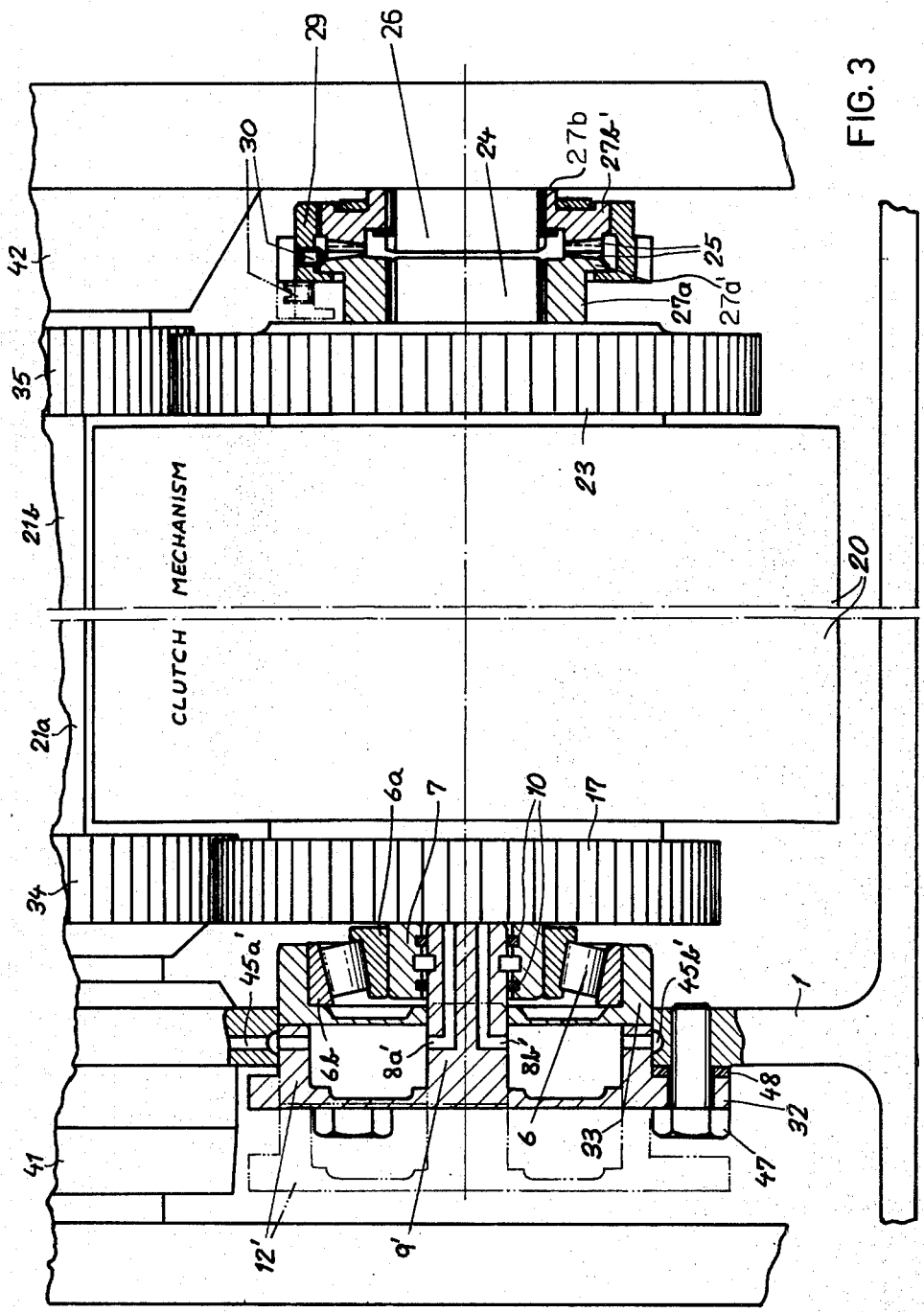
FIG. 3 is an axial sectional view of another clutch mounting according to my invention.

In FIGS. 1 and 2 I have shown part of a transmission housing 1 in which a drive shaft 26, powered by a nonillustrated automotive engine, is journaled with the aid of a roller bearing 39. Offset from but parallel to drive shaft 26 are two driven shafts 21a and 21b journaled in housing 1 by means of similar bearings 41 and 42. Shafts 21a and 21b, which could pertain to separate gear trains but could also be parts of a single shaft to be selectively rotated at different speeds, carry respective gears 34 and 35 in mesh with two gears 17 and 23 idling on opposite extremities 7 and 24 of an intermediate shaft coaxial with drive shaft 26; this intermediate shaft passes through a casing 20 of a conventional clutch mechanism not otherwise illustrated. Gears 17 and 23, supported on shaft extremities 7 and 24 by respective ball bearings 36 and 37, can be coupled with the intermediate shaft by respective clutches within casing 20 which may be of the lamellate type and are actuatable by oil entering that casing via passages 44a and 44b in shaft extremity 7.

Drive shaft 26 and the adjoining intermediate-shaft extremity 24 are provided with axially extending coupling teeth 25 which in FIG. 1 are disposed on annular zones of the confronting shaft ends but in FIG. 2 are provided on annular flanges of two sleeves 27a and 27b respectively keyed to extremity 24 and shaft 26. The opposite shaft extremity 7 carries a frustoconical inner race 6a of a thrust and journal bearing with a set of rollers 6 separated by a nonillustrated cage, a frustoconical outer race 6b being supported by an annular skirt 46 of a generally disk-shaped retaining member 12 received in a wall of transmission housing 1. Member 12 has a central boss 9 extending into a bore 49 of shaft extremity 7 in the assembled position of FIG. 2 in which this member is held against rotation by a tooth of a detent 2 engaging in an axially extending slot 40 of skirt 46; detent 2 is a sheet-metal strip secured to the housing wall by several screws 3 (only one shown). Boss 9 is provided with a pair of sealing rings 10, e.g. of Teflon, contacting the inner wall of the shaft bore 49. A peripheral flange 13 of member 12 has external threads engaged by a surrounding nut 14 which is provided with peripheral indentations 43 to facilitate its rotation by a suitable wrench. Nut 14 is guided in a ring 5 in which it is held against axial displacement by a locking ring 16; a similar locking ring 15 holds the guide ring 5 in position on the wall of housing 1. Another detent 4, with a tooth engaging in one of the recesses 43 of nut 14 to prevent its untimely rotation, is snap-fitted to housing 1 and can be manually removed preparatorily to disassembly of the clutch mounting.

Bearing 37, which in FIG. 1 is held in position on shaft extremity 24 by a locking ring 38, is carried in FIG. 2 on sleeve 27a and abuts a shoulder of that sleeve.

Passages 44a and 44b communicate in the assembled condition with respective passages 8a and 8b of retaining member 12 which in turn are aligned with channels 45a and 45b of housing 1 for the supply of oil under pressure to the lamellate clutches inside casing 20 controlling the entrainment of gears 17 and 23, respectively. In the more specific case in which driven shafts 21a, 21b and their associated gears 17, 34 and 23, 35 are part of respective branches of identical transmission ratios included in a common power train of the torque-splitting type linking the drive shaft 26 with the traction rollers of the vehicle (or possibly with some other load such as a take-off shaft), these two clutches may be jointly actuatable so as to require only one supply channel.

To disassemble the clutch mounting after removal of detent 4, nut 14 is rotated so as to withdraw the retaining member 12 into the position of FIG. 1. Clutch casing 20 can now be bodily shifted toward the left, together with its intermediate shaft and the gears 17 and 23 carried on the extremities 7 and 24 thereof, so as to disengage the coupling teeth 25 whereupon this component can be radially extracted from housing 1 in direction away from shafts 21a, 21b. If the outer bearing race 6b moves axially with member 12 so as to separate from inner race 6a, as shown, rollers 6 should be held in place by their cage. Alternatively, such separation may be prevented by interlocking formations on the cage and the races.

In the embodiment of FIG. 3, in which drive shaft 26 and the confronting extremity 24 of the intermediate clutch shaft are provided with respective sleeves 27a and 27b as in FIG. 2, a cap nut 29 reaches around the 27a of sleeve 27a and threadedly engages the flange 27b' of sleeve 27b to lock the teeth 25 in their meshing position. Cap nut 29 is secured against rotation by a grub screw 30, as in the conventional system referred to above. Upon a loosening of this grub screw, the nut 29 can be detached from sleeve 27b preparatorily to disassembly as indicated in phantom lines. In this instance the outer bearing race 6b is received in a separate annular carrier 33 which is under axial pressure from a retaining member 12' secured to housing 1 by screws 47. Washers 48 inserted between member 12' and the housing wall allow for an adjustment of this axial pressure which in the preceding embodiment was controlled by the extent of rotation of nut 14. A central boss 9' of member 12' has passages 8a' and 8b' communicating, upon assembly, with channels 45a', 45b' in housing 1 and with nonillustrated passages in shaft extremity 7 to control the operation of the clutches inside casing 20. After removal of screws 47, member 12' may be axially withdrawn as indicated in phantom lines, thus clearing the way for an axial shift of clutch casing 20 to disengage the teeth 25 of drive shaft 26 and intermediate-shaft extremity 24 from each other.

Figure 4:
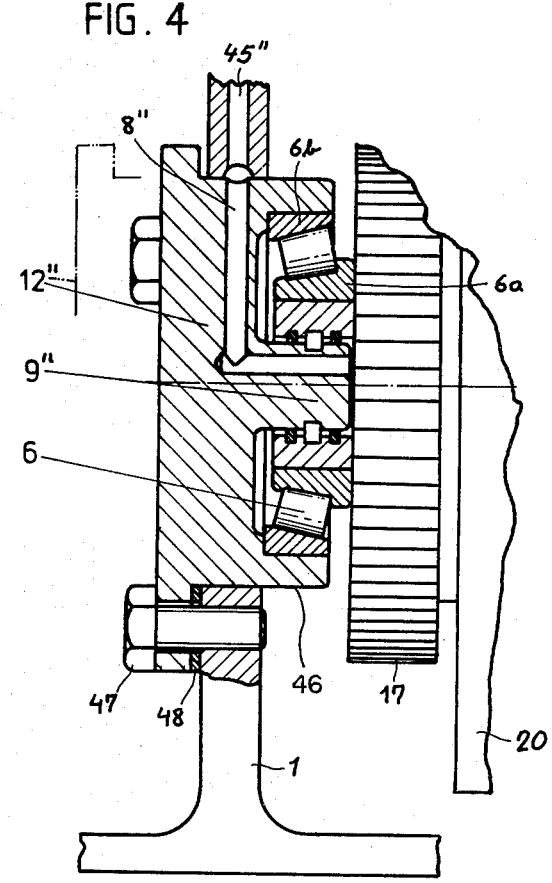
FIG. 4 is a fragmentary view of a modification of the left-hand end of the clutch mounting shown in FIG. 3.

In FIG. 4 I have shown another modification which differs from the embodiment of FIG. 3 in that a retaining member 12", secured to housing 1 by screws 47 with interposed washers 48, has a skirt 46 similar to that of member 12 in FIGS. 1 and 2 to form a seat for the outer bearing race 6b. A passage 8" extending partly inside a boss 9" of member 12" communicates, upon assembly, with a supply channel 45" in the housing. The retracted position of member 12" has again been indicated in phantom lines.

Though extremities 7 and 24 have been assumed hereinabove to be part of a single intermediate clutch shaft, they could of course also be the ends of two separate shafts interconnected by suitable means. Furthermore, the coupling between drive shaft 26 and intermediate-shaft extremity 24 may be achieved by formations other than the illustrated teeth 25, such as coacting claws or interfitting tongues and grooves, disengageable by an axial shift.

I claim:

1. A transmission system comprising:
    a housing;
    a drive shaft journaled in said housing;
    driven shaft means offset from said drive shaft and journaled in said housing;
    fluid-actuatable clutch means in said housing for optionally transmitting torque from said drive shaft to said driven shaft means, said clutch means being traversed by intermediate shaft means having two oppositely projecting extremities coaxial with said drive shaft;
    a first pair of gears idling on said extremities and meshing with a second pair of gears on said driven shaft means, said first pair of gears being couplable with said intermediate shaft means by actuation of said clutch means;
    a coupling between said drive shaft and one extremity of said intermediate shaft means, said coupling including interengaging axially extending formations on said drive shaft and said one extremity;
    a retaining member detachably secured to said housing; and bearing means axially and radially supporting the other extremity of said intermediate shaft means on said retaining member, said other extremity and said retaining member being provided with communicating passages for the selective admission of actuating fluid to said clutch means, said formations being disengageable by an axial shift of said clutch means relative to said housing after detachment of said retaining member to facilitate radial extraction of said clutch means jointly with said intermediate shaft means and said first pair of gears from said housing.

2. A transmission system as defined in claim 1 wherein said formations are disposed on confronting faces of said one extremity and said drive shaft.

3. A transmission system as defined in claim 1 wherein said one extremity and said drive shaft are provided with respective sleeves keyed thereto, said formations being disposed on confronting annular surfaces of said sleeves.

4. A transmission system as defined in claim 3 wherein said coupling further comprises a cap nut bearing upon a radial flange of one of said sleeves and threadedly engaging the other of said sleeves.

5. A transmission system as defined in claim 1, 2, 3 or 4 wherein said retaining member comprises a disk perpendicular to the axis of said drive shaft provided with an axial boss extending into an axial bore of said other extremity, said passages being partly disposed in said boss.

6. A transmission system as defined in claim 5 wherein said disk is provided with external threads and is axially shiftable but nonrotatable in a wall of said housing, further comprising a nut engaging said threads, said nut being rotatable but axially nonshiftable in said wall and being provided with locking means releasable to enable an axial withdrawal of said disk by rotation of said nut relative to said wall.

7. A transmission system as defined in claim 5 wherein said disk is bolted to a wall of said housing.

8. A transmission system as defined in claim 5 wherein said bearing means comprises a frustoconical inner race on said other extremity, a frustoconical outer race surrounding said inner race, and a set of rollers interposed between said races, said outer race being held in position around said rollers by said disk.

9. A transmission system as defined in claim 8, further comprising an annular carrier for said outer race separate from but in contact with said disk.

10. A transmission system as defined in claim 8 wherein said disk has an annular skirt supporting said outer race.

* * * * *